Aug. 19, 1969  W. D. BELLAMY  3,462,275
WASTE CONVERSION PROCESS AND PRODUCT
Filed Jan. 31, 1968

Inventor:
Winthrop D. Bellamy,
by William T. Black
His Attorney.

United States Patent Office 3,462,275
Patented Aug. 19, 1969

3,462,275
WASTE CONVERSION PROCESS AND PRODUCT
Winthrop D. Bellamy, Schenectady, N.Y., assignor to General Electric Company, a corporation of New York
Filed Jan. 31, 1968, Ser. No. 702,119
Int. Cl. A23k 1/00
U.S. Cl. 99—9                                  12 Claims

ABSTRACT OF THE DISCLOSURE

Solid, organic, biodegradable waste materials are treated with selected thermophilic microorganisms and heated to temperatures of from 45° C. to 80° C. with agitation while introducing oxygen to the mixture. The thermophilic microorganisms multiply under these conditions and convert the organic biodegradable waste materials to cellular proteinaceous materials and other cellular compounds. Pasteurized cellular proteinaceous materials and other pasteurized cellular compounds, which find utility as animal feed supplements and as sources of extractable proteins, are produced by employing temperatures of over 55° C. The pasteurized liquid simultaneously produced can be discharged without further treatment unless the phosphorus or nitrogen content are objectionable.

---

Figure 1:
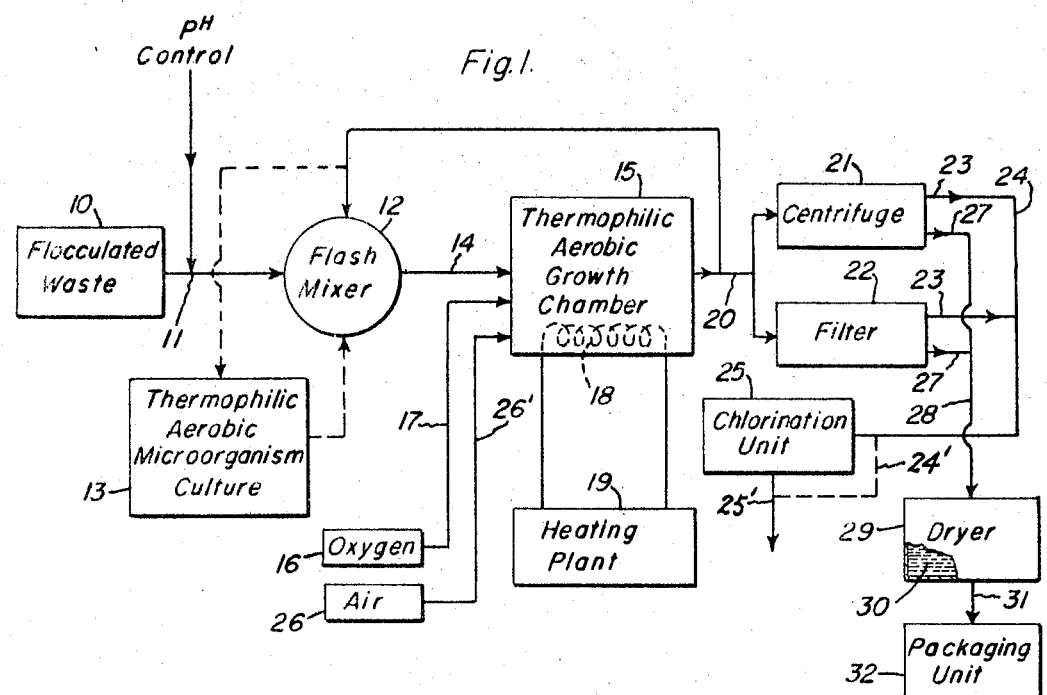

The present invention relates to the utilization of aqueous suspensions of biodegradable organic compounds. The invention converts such suspensions into useful products, such as, high protein animal fodder and sources of extractable protein. The invention can be used for treating certain agricultural and industrial wastes and for domestic and municipal sewage.

Present day conventional methods for handling liquid waste, such as, municipal sewage and biodegradable organic industrial wastes, depend upon microbial oxidation. In the activated sludge process in use today, up to 90% of the organic material is removed as a solid residue or semi-solid sludge. The residue must be disposed of by such methods as land filling, dumping at sea, burning, and soil conditioning, etc. All of the above methods of disposal are expensive and therefore unsatisfactory.

It is an object of this invention to provide for a method of disposing of sewage sludge by converting said sludge to a source of extractable protein and, in some instances, to animal feed supplements.

It is a further object of this invention to provide a method of producing a sewage effluent, low in phosphorus and nitrogen compounds, that can be recirculated in a drinking water system or discharged into rivers and streams without deleterious effects.

Another object of this invention is to harvest the sludge from waste water treatment systems under conditions that will not permit a loss of the phosphate from the sludge back into the water.

The above objects together with other objects are obtained in the practice of the process of this invention as hereinafter described.

In accordance with this invention biodegradable organic waste materials are treated with selected thermophilic microorganisms as hereinafter described and the mixture heated to temperatures of from 45° C. to 80° C. while supplying oxygen to the mixture. The selected thermophilic microorganisms at this temperature and under the aerobic conditions multiply and convert the organic flocculants, organic flocculant aids and organic waste materials to cellular proteinaceous materials and other cellular components.

As will be described in greater detail hereinbelow, by operating at temperatures in excess of 55° C. pasteurization of the cellular proteinaceous materials and other cellular components is simultaneously accomplished.

The amount of biodegradable organic sludge and waste materials present in the mixture is not narrowly critical and can be as low as 0.1% to as high as 15% by weight, or higher. It is preferred, however, for economic reasons to employ a biodegradable mixture which contains at least 2% solids by weight since employing organic waste materials which contain greater than 98% liquid by weight requires the heating of excessive amounts of liquid without any commensurate advantages.

As has been pointed out above, the temperature at which the process of this invention is operated can be from 45° C. to 80° C. However, for best results it is preferred to employ temperatures of from 55° C. to 70° C. In this temperature range, the thermophilic microorganisms multiply rapidly in the presence of oxygen and the final material is pasteurized; that is, the pathogenic organisms, etc., are destroyed at these temperatures, thereby yielding a solid product which can be further employed as feed for animals or feed supplements for animals without introducing these pathogenic organisms into the animals.

Inasmuch as oxygen is necessary in the process of this invention, one can supply the oxygen by bubbling air or distributing air either at atmospheric pressure or under superatmospheric pressure into the reaction chamber with the thermophilic microorganisms and the biodegradable organic waste materials. The amount of oxygen added is adjusted so that the mixture contains at least 0.3 mg. of oxygen per liter of mixture. The amount of dissolved oxygen can be at high as 2.0 mg. per liter of mixture or even higher, the upper limit on the amount of oxygen present merely being an economic determination. Greater amounts of oxygen give no economic advantage in the process of this invention. The amount of dissolved oxygen is also limited by the particular system that one is employing; that is, when the system becomes saturated with oxygen, employing further oxygen, of course, would not be advantageous.

In the practice of the process of this invention, it is advantageous to control the pH of the system. The pH of the system should be maintained between 5.5 and 8.5. It is preferred that the pH of the system be maintained at approximately 6.5 to 8.0 for best results in the practice of this invention. The pH can be adjusted by the addition of neutralizing agents, such as, hydrochloric acid, sodium hydroxide, or other common neutralizing agents. The invention is illustrated in the accompanying drawing wherein FIGURE 1 is a schematic flowsheet illustrating the preferred process of this invention. It would, of course, be obvious to those skilled in the art that many modifications of the process of this invention can be practiced within the scope and spirit of the invention without departing therefrom.

Figure 2:
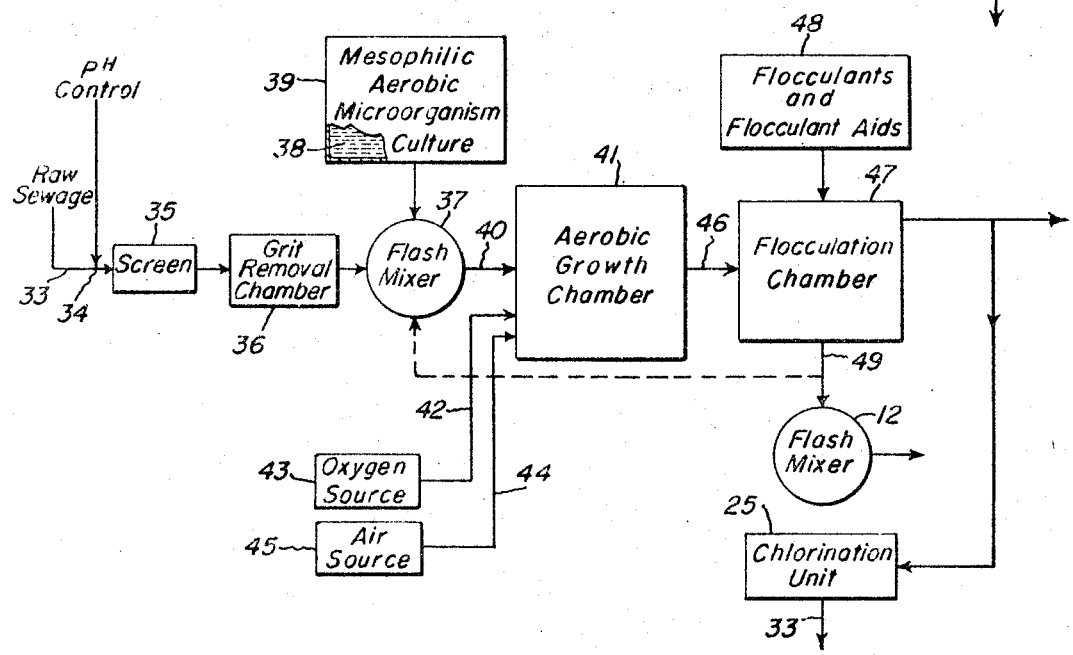

FIGURE 2 is a schematic flowsheet illustrating a preliminary treatment of organic sewage or organic biodegradable waste materials whereby one obtains an effluent that can be employed as a municipal water source or can be returned to the stream without adding to the phosphorus and nitrogen content of this stream, thereby adding to the pollution of the streams and waterways.

Referring particularly to FIGURE 1, upon entering the treatment plant, the biodegradable flocculated waste 10 is monitored for pH, and the pH adjusted at station 11 as required to maintain a range of from about 5.5 to 8.5 with suitable chemicals, such as, hydrochloric acid or sodium hydroxide or other inexpensive alkali or acid. The organic biodegradable waste 10 is then passed into mixing chamber 12. In the mixing chamber 12 the waste 10 and the thermophilic aerobic microorganism culture 13 are agitated violently until a homogeneous mixture is obtained. The mixture 14 is then passed into the thermophilic aerobic growth chamber 15 which contains a means for heating or cooling 18 and an oxygen inlet line 17 and the mixture heated to from 45° C. to 80° C. by heat supplied from heating and cooling plant 19, while supplying oxygen to the mixture from oxygen source 16 or supplying air through line 26' from air source 26 for a period of time of from 2 to 24 hours, wherein the aerobic microorganisms multiply rapidly and digest the organic biodegradable waste to yield cellular proteinaceous and other cellular materials, and at the same time if temperatures in excess of 55° C. are employed, destroying any pathogenic organisms. After the process is started, it may be necessary to provide a coolant to regulate the temperature. A portion of the reacted waste mixture 20 in the thermophilic growth chamber 15 can then be returned either to mixing chamber 12 for inoculation of further organic biodegradable waste 10 or to the thermophilic aerobic microorganism culture chamber 13, and thereafter added as culture to the mixing chamber 12. The reacted waste mixture 20 from the thermophilic aerobic growth chamber 15 is passed through a filter 22 or centrifuge 21 yielding a liquid 23 and a solid cellular proteinaceous material 27. The liquid 23, depending upon its nitrogen and phosphorus content and other inorganic mineral content, may be passed via a conduit 24 to chlorination unit 25 for chlorination, and then returned via pipe 25' to a municipal water system or discharged in the lakes and streams or alternatively, when the liquid is in the pasteurized condition it can be discharged through pipe 24' directly into lakes and streams without chlorination.

The solid cellular proteinaceous material 27 is passed via conducting means 28 to a dryer 29 where the water content is greatly reduced. The dried material 30 (preferably in the pasteurized condition) is then conveyed via conveyor 31 to a packaging unit 32 for packaging as animal feed supplement material or as a source of extractable protein.

If the phosphorus and/or nitrogen content of the liquid 23 is too high, it may be returned to preliminary sewage treatment plant for removal of the phosphorus and nitrogent or alternatively, may be employed as part of the nonsolid portion of the organic biodegradable waste in chamber 15.

FIGURE 2 is a schematic flow diagram of a preliminary sewage disposal system, which when combined with the thermophilic aerobic digestion process of this invention, provides a complete sewage disposal system. In such a system on entering the sewage treatment plant via conduit 33 the raw sewage is continuously monitored for pH and adjusted as required at station 34. The sewage flow is then passed through conventional screening 35 and grit removing apparatus 36 and then into mixing chamber 37. In the mixing chamber 37, the sewage flow and either recycle sludge or mesophilic aerobic microorganism culture 38 from chamber 39 are mixed with violet agitation until a homogeneous mixed liquor is produced.

The mixed liquor 40 from the mixer 37 is then introduced into aerobic growth chamber 41. Oxygen is supplied thereto via line 42 from oxygen source 43. The mixed liquor is oxygenated in the chamber at the rate sufficient to maintain therein at least about 0.3 mg. of dissolved oxygen per liter of mixed liquor for a period of at least 10 minutes. The preferred dissolved oxygen content of the mixed liquor is 0.5 mg. per liter in the chamber 41, although the oxygen level may be maintained from about 0.3 to 2.0 mg. per liter. Greater amounts of oxygen may be employed, if desired, but are not economically advantageous. Air is then supplied to the oxygenated mixed liquor in the chamber through conduit 44 from air source 45 at a rate sufficient to maintain the dissolved oxygen level within the above limits for a period of at least 1½ or 1.5 hours. The dissolved oxygen is controlled and maintained within the above limits by employing means such as dissolving oxygen electrodes in the chamber 41. The oxygenated and aeration can be operated within a single chamber 41 as shown in FIGURE 2, or they may be conducted in two different and separate chambers, thereby forming a continuous treatment process in accord with this invention. The treated effluent mixed liquor 46 is fed into a flocculation chamber 47 where flocculants and flocculation aids from chamber 48 are added and the solids precipitated. The precipitated material contains a substantial portion of the phosphate present in the sewage. The clarified waste liquor is discharged through an outfall to a chlorination chamber 25 or directly into the streams. The harvested flocculated material 49 is divided into two portions, one portion being returned to flash mixer 37 and the remainder being fed into mixer 12 (shown in FIGS. 1 and 2) for further treatment in accordance with the process shown in FIGURE 1 and described hereinabove to yield the cellular proteinaceous material produced in accordance with this invention.

The organic diodegradable waste materials which can be converted in accordance with the process of this invention, include the sewage sludge from present day primary sewage treatment plants, from secondary treatment plants e.g., activated sludge processes, etc., from combined primary and secondary treatment plants such as the sewage treatment process of Levin, U.S. Patent 3,236,766, slaughter house sewage effluent, dairy wastes, etc. Furthermore, by the use of organic biodegradable flocculants and flocculant aids dilute suspensions of biogradable organic materials can be concentrated and converted into a useable biomass. Therefore the phytoplankton and zooplankton in fresh and salt water could be harvested and converted in accordance with the process of this invention.

It is preferred to alter the processes described above by employing organic flocculants and flocculant aids, so that the concentration of inorganic solids in the incoming sludge to flash mixer 12 is rendered relatively low to avoid producing an animal feed supplement that would be high in inorganic solids.

The types of organic flocculants that are employed in the process of this invention include commercially available cationic polyelectrolytes, anionic polyelectrolytes and nonionic polyelectrolytes. Specific flocculants include, but are not limited to, polyethylenimines, lignosulfonates, polyamides, carboxymethylcellulose and modified starch. The proportions of these organic flocculants are adjusted for variations in the nature of the waste being treated so as to achieve efficient sedimentation. The flocculation process can be improved by the use of finely divided particulate solids as flocculant aids. For the purpose of this invention it is desirable to use finely divided cellulosic materials, such as, ground newspaper, wood flour or straw powder as the flocculant aid, because such materials are converted into useful products when the flocculated sludge is treated with aerobic thermophilic microorganisms in accordance with the process of this invention.

The populations of thermophilic microorganisms that are employed in the process of this invention are selected in order that the natural organic polymers, such as cellulose, starch, pentosants, lignins, etc., in wastes be utilized at practical rates. The mixed populations of thermophilic microorganisms useful in the process of this invention include any or all of the following organisms:

*Streptomyces thermoviolaceus,* Thermopolyspora species, Thermomonospora species, *Thermoactinomyces glaucus, Chaetomium thermophile, Humicola insolens,* Talaromyces species, Coprinus species, Sporotrichum species, *Mucor meihei,* Aspergillus species, *Malbranchea pulchella, Thermoascus aurantiacus,* Paecilomyces species, Cellulomonas species, Agrobacterium species, Pseudomonas species, Flavobacterium species, Xanthomonas species, Micrococcus species, *Bacillus subtilis* thermophilic species, etc.

The mixed population is not limited to the above-mentioned microorganisms but includes other uncharacterized strains. It always includes organisms that cannot degrade the polymers but live as saprophytes on the degraded products. They may contribute to the overall assimilation rate by producing growth factors for the active organisms. Among the mixed populations that have been found to be useful in the process of this invention are those obtained from sources such as compost heaps and from hot springs and anomalous hot earth areas, such as those at Yellowstone National Park.

The temperature of growth and the nature of the organic substrate are determining factors in selection of the dominant microorganisms in a mixed population. None of the fungi and very few of the actinomyces, for example, are found in systems run at 60° C. or greater; the dominant populations are the bacteria, while at temperatures below 55° C. mixed populations of fungi, actinomyces and bacteria develop.

When the process of this invention is employed in combination with the sewage treatment process of Levin described in the above-identified U.S. Patent to which organic flocculants and flocculant aids are added as described hereinabove, in addition to obtaining the animal feed supplement by the process of this invention, there is obtained via conduit 24 an effluent which is very low in phosphorus and nitrogen. Such an effluent may be employed in water systems as produced, if pasteurized (or after appropriate treatment, if not pasteurized) or may be discharged into lakes and streams without the deleterious effects, such as, algae bloom, etc., so common in the ponds and streams today.

For example in the treatment of raw sewage on entering the sewage treatment plant the sewage is monitored for pH and adjusted as required to maintain the range from about 5.5 to about 8.5 with suitable chemicals such as hydrochloric acid, sodium hydroxide or other inexpensive alkali or acid. The sewage is then passed through conventional screening and grit removing units and then into a mixing chamber. In the mixing chamber, the raw sewage and return sludge containing the aerobic microorganisms are mixed with violent agitation until a homogeneous mixed liquor is produced. Complete mixing of the sludge and the raw sewage flow is desired for maximum efficiency of the overall sewage treatment process. The mixture is then aerated with an oxygen-containing gas to maintain the oxygen content in the range of from 0.3 to 2.0 mg. per liter, and the oxygenated mixed liquor maintained at this dissolved oxygen level for a period of at least one and one half hours. The upper limits of the oxygenation and aeration times are based on the economic of operation of the process. This treatment removes the phosphate from the liquid in the sewage treatment process. The mixed liquor is then mixed with organic biodegradable flocculants and biodegradable organic flocculant aids, as herein above described, in order to precipitate the the suspended solids. The effluent is returned to the municipal water system after appropriate treatment or to the stream or otherwise disposed of. The sludge, which contains substantial portions of the phasphate and a substantial portion of the nitrogen present in the incoming raw sewage, is then treated by admixing it with the thermophilic microorganism system, adjusting to the correct pH and treating in the thermophilic chamber in accordance with the herein above described process. In this manner, the biodegradable organic waste materials present are converted to animal feed supplements in accordance with the process of this invention.

Crude proteins from the cellular material produced by this invention can be extracted by hot alkali. The protein can be partially purified by dialysis against water after neutralization. The resulting product contains mixed proteins plus some nucleic acids and carbohydrates. Further purification can be accomplished by redissolving the product in alkali and fractionally precipitating with ammonium sulfate or alcohol.

It is evident that the total amount of pasteurized protein and the fraction of protein in the pasteurized cellular proteinaceous product will vary with the original composition of the sewage sludge and with the time of incubation at or over 55° C. The following is an illustration of a method for separating the proteins.

The cellular proteinaceous material produced by the process of this invention (about 10–12 grams dry weight) was made into a thick paste with water and then made 3 N alkalinity with concentrated NaOH. Total volume was about 50 ml. The paste was heated to 100° C. for 15 min., cooled, diluted to 200 ml. with water and centrifuged. A colorless opalescent supernatant liquid was obtained that contained 0.72 grams of protein as determined by the biuret color reaction. Dialysis of this liquid against water for 24 hours and evaporation of water produced a solid product (1.12 gm.) that was about 60% protein.

The following examples are illustrative of this invention and are not to be construed as limitations thereon.

EXAMPLE 1

A five liter sample of raw municipal sewage was mixed with one and a quarter liters of activated sludge and aerated for 18 hours at 25° C. The pH was maintained between 7.0 and 8.0 and the dissolved oxygen was maintained greater than 0.3 mg. of oxygen per liter of mix. At the end of this time, the aerated liquor was thoroughly mixed with finely ground newspaper to a final concentration of 0.2% by weight. To this was added cationic flocculant (Rhom and Haas Prima Floc C–7, a high molecular weight polymeric cationic flocculant) to a final concentration of 20 milligrams per liter. The mixture was flushed with oxygen until the dissolved oxygen was greater than 5.0 milligrams per liter. The mixture was allowed to settle and the clear supernatant fluid removed. During the settling, the dissolved oxygen did not drop below 0.5 mg. per liter. The sludge was warmed to 55° C. and thoroughly mixed with an equal volume of inoculum from a previously treated sewage sludge that had been inoculated with a mixed population of thermophilic microorganisms obtained from a compost heap and had been incubated at 55° C. for 10 hours. The resultant mixture was incubated at 55° C. while the dissolved oxygen was maintained at 2 to 5 milligrams per liter. After 10 hours incubation at 55° C. a solid biomass was harvested by centrifugation. This biomass, which had been "pasteurized," i.e., freed of all pathogenic microorganisms by the thermophilic process, was dried in vacuo for approximately 16 hours at 20 to 30° C.

EXAMPLE 2

The process of Example 1 was repeated except that wood dust was used as a flocculating aid in place of the ground newspaper. A biomass was obtained which is useful as an animal feed.

EXAMPLE 3

The process of Example 1 was repeated except that nitrogen in the form of urea and phosphorus in the form of inorganic orthophosphates were added to the thermophilic sludge until the nitrogen to carbon ratio was not less than 1 to 10 and the phosphorus to carbon ratio not less than 1 to 30. A biomass was harvested after 10 hours incubation at 55° C. by centrifugation and dried as in Example 1. The dried solid is useful for animal feed.

The nitrogen and phosphorus were added because the optimum rate of conversion to cellular proteinaceous material will not occur if the sludge is deficient in either of these elements.

What is claimed as new and is desired to be secured by Letters Patent of the United States is:

1. A process for treating biodegradable organic waste material to produce cellular proteinaceous material which comprises
    (a) mixing solid biodegradable organic waste material suspended in a liquid medium with a thermophilic aerobic microorganism culture capable of digesting cellulose in said liquid medium, the suspended solids content being in excess of 0.1% by weight,
    (b) adjusting the pH of the mixture to be between 5.5 and 8.5,
    (c) introducing an oxygenating gas into the mixture so as to maintain the dissolved oxygen content at at least 0.3 mg. per liter of said mixture while,
    (d) maintaining said mixture at a temperature of from 45° C. to 80° C., in which temperature range said thermophilic aerobic microorganisms multiply and digest said biodegradable organic waste material to produce cellular proteinaceous material and
    (e) separating cellular proteinaceous material from the balance of the mixture.

2. A process as claimed in claim 1, wherein the biodegradable waste mater is flocculated sludge produced by a mesophilic aerobic digestion of polluted wastewater, the sludge being precipitated by means of biodegradable flocculants and biodegradable flocculant aids.

3. A process as claimed in claim 1, wherein the biodegradable organic waste and liquid medium are not polluted.

4. A process as claimed in claim 1, wherein the oxygenating gas is introduced for a period of time of from 2 to 24 hours.

5. A process as claimed in claim 1, wherein an amount of nitrogen-containing compound is added to the mixture sufficient to provide a nitrogen to carbon ratio of not less than 1 to 10.

6. A process as claimed in claim 1, wherein an amount of phosphorus-containing compound is added to the mixture sufficient to provide a phosphorus to carbon ratio of not less than 1 to 30.

7. A process as claimed in claim 1, wherein the biodegradable waste material is the carbon-enriched, flocculated sludge from a primary or secondary sewage treatment plant.

8. A process as claimed in claim 7, wherein the sludge was precipitated with biodegradable flocculant and biodegradable flocculent aids.

9. A process for treating biodegradable organic waste material to produce a pasteurized cellular proteinaceous material which comprises
    (a) mixing a solid biodegradable organic waste material suspended in a liquid medium with a thermophilic aerobic microorganism culture capable of digesting cellulose in said liquid medium, the suspended solids content being in excess of 0.1% by weight,
    (b) adjusting the pH of the mixture to be between 5.5 and 8.5,
    (c) introducing an oxygenating gas into the mixture so as to maintain the dissolved oxygen content at at least 0.3 mg. per liter of said mixture while,
    (d) maintaining said mixture at a temperature of from 55° C. to 80° C. in which temperature range said thermophilic aerobic microorganisms multiply and digest said biodegradable organic waste material to produce cellular proteinaceous material and pathogenic organisms in the mixture are destroyed and
    (e) separating the pasteurized cellular proteinaceous material so produced from the balance of the pasteurized mixture.

10. A process as claimed in claim 9, wherein the biodegradable waste material is the carbon-enriched, flocculated sludge from a primary or secondary sewage treatment plant.

11. A process as claimed in claim 9, wherein the sludge was precipitated with biodegradable flocculent and biodegradable flocculant aids.

12. The pasturized solid product produced in accordance with the process of claim 9.

References Cited

UNITED STATES PATENTS

| | | | |
|---|---|---|---|
| 1,980,244 | 11/1934 | Wright | 210—75 X |
| 3,025,151 | 3/1962 | Berg et al. | 210—10 X |
| 3,219,575 | 11/1965 | Chapman et al. | 210—7 |
| 3,236,766 | 2/1966 | Levin | 210—6 |
| 3,337,448 | 8/1967 | Rich | 210—12 X |
| 3,356,609 | 12/1967 | Bruemmer | 210—12 X |

FOREIGN PATENTS 652,585  11/1962  Canada.

MICHAEL E. ROGERS, Primary Examiner

U.S. Cl. X.R.

99—149; 195—4; 210—11, 15, 51, 5.